United States Patent
Sung et al.

(10) Patent No.: US 8,503,521 B2
(45) Date of Patent: Aug. 6, 2013

(54) METHOD OF DIGITAL VIDEO REFERENCE FRAME COMPRESSION

(75) Inventors: Chih-Ta Star Sung, Glonn (DE);
Yin-Chun Blue Lan, Wurih Township, Taichung County (TW)

(73) Assignee: Chih-Ta Star Sung, Juhdong (TW)

( * ) Notice: Subject to any disclaimer, the term of this patent is extended or adjusted under 35 U.S.C. 154(b) by 1940 days.

(21) Appl. No.: 11/653,486

(22) Filed: Jan. 16, 2007

(65) Prior Publication Data
US 2008/0170626 A1   Jul. 17, 2008

(51) Int. Cl.
*H04N 7/12* (2006.01)
*H04B 1/66* (2006.01)

(52) U.S. Cl.
USPC ................................... 375/240.01

(58) Field of Classification Search
None
See application file for complete search history.

(56) References Cited

U.S. PATENT DOCUMENTS

| | | | | |
|---|---|---|---|---|
| 5,481,619 A | * | 1/1996 | Schwartz et al. | 382/141 |
| 7,382,925 B2 | * | 6/2008 | Boliek et al. | 382/233 |

* cited by examiner

*Primary Examiner* — Nhon Diep

(57) ABSTRACT

The digital video referencing frame image is compressed block by block by applying lossless compression algorithm to pixel components with full length, or 1 bit, 2 bits, 3 bits or 4 bits LSB bits truncation. If a sub-block has high complexity which results in more than 3 bits error for most pixel components, a transfer algorithm with quantization and VLC coding is applied to compress this sub-block. Should the complexity is higher than a threshold or at least one sub-block having error of more than 3 bits for most pixel components, truncating 1 LSB bit of sub-block with simple pattern to save more bits to be allocate to code the sub-block with highest complex pattern.

8 Claims, 9 Drawing Sheets

$$SAD(x,y) = \sum_{i=0}^{15} \sum_{j=0}^{15} |V_n(x+i, y+j) - V_m(x+dx+i, y+dy+j)|$$

$$MAD(x,y) = \frac{1}{256} \sum_{i=0}^{15} \sum_{j=0}^{15} |V_n(x+i, y+j) - V_m(x+dx+i, y+dy+j)|$$

METHOD OF DIGITAL VIDEO REFERENCE FRAME COMPRESSION

BACKGROUND OF THE INVENTION

1. Field of Invention

The present invention relates to digital video frame buffer compression, and, more specifically to an efficient referencing frame image compression method that results in the saving of memory density, the time of accessing the referencing image and reduction of power consumption.

2. Description of Related Art

ISO and ITU have separately or jointly developed and defined some digital video compression standards including MPEG-1, MPEG-2, MPEG-4, MPEG-7, H.261, H.263 and H.264. The success of development of the video compression standards fuels wide applications which include video telephony, surveillance system, DVD, and digital TV. The advantage of digital image and video compression techniques significantly saves the storage space and transmission time without sacrificing much of the image quality.

Most ISO and ITU motion video compression standards adopt Y, Cb and Cr as the pixel components, which are derived from the original R (Red), G (Green), and B (Blue) color components. The Y stands for the degree of "Luminance", while the Cb and Cr represent the color difference been separated from the "Luminance". In both still and motion picture compression algorithms, the 8×8 pixels "Block" based Y, Cb and Cr goes through the similar compression procedure individually.

There are essentially three types of picture encoding in the MPEG video compression standard. I-frame, the "Intra-coded" picture uses the block of 8×8 pixels within the frame to code itself. P-frame, the "Predictive" frame uses previous I-type or P-type frame as a reference to code the difference. B-frame, the "Bi-directional" interpolated frame uses previous I-frame or P-frame as well as the next I-frame or P-frame as references to code the pixel information. In principle, in the I-frame encoding, all "Block" with 8×8 pixels go through the same compression procedure that is similar to JPEG, the still image compression algorithm including the DCT, quantization and a VLC, the variable length encoding. While, the P-frame and B-frame have to code the difference between a target frame and the reference frames.

In decompressing the P-type or B-type of video frame or block of pixels, accessing the referencing memory requires a lot of time. Due to I/O data pad limitation of most semiconductor memories, accessing the memory and transferring the pixels stored in the memory becomes bottleneck of most implementations. One prior method overcoming the I/O bandwidth problem is to use multiple chips of memory to store the referencing frame which cost linearly goes higher with the amount of memory chip. Some times, higher speed clock rate of data transfer solves the bottleneck of the I/O bandwidth at the cost of higher since the memory with higher accessing speed charges more.

The method and apparatus of this invention significantly speeds up the procedure of reconstructing the digital video frames of pixels without costing more memory chips or increasing the clock rate for accessing the memory chip.

SUMMARY OF THE INVENTION

The present invention is related to a method of digital video referencing frame image compression and decompression which reduces the memory density, speeds up the procedure of accessing the referencing frame buffer with less power consumption. The present invention reduces the computing times compared to its counterparts in the field of video stream compression and decompression and reaches higher image quality.

The present invention of this efficient video bit stream compression and decompression applies a compression and decompression method to reduce the data rate of the digital video frames which are used as reference for other non-intra type blocks of image in motion estimation and motion compensation.

The present invention applies the following procedures to achieve low bit rate of storing the reference frame data into a temporary storage device:

Determining the length of pixels within a block which results in lossless compression when the selected VLC coding algorithm is applied.

Calculation of the differential value of adjacent pixels by applying an appropriate coding method to those sub-blocks of pixels having simpler patterns. and Applying transform function and quantization and another VLC coding method to reduce bit rate of the sub-blocks of pixels having complex patterns.

According to one embodiment of the present invention, Y luminance and U/V chrominance component of each block are compressed separately with separate divider values.

According to one embodiment of the present invention, a predetermined bit rate ratio between the Y and U/V is fixed for each block of pixel within a referencing image frame.

According to one embodiment of the present invention, a DCT is applied to transform the time domain pixels into frequency domain for the block or sub-block of pixels with complex pattern.

According to one embodiment of the present invention, if a worst case happened in one of the sub-block, at least one of the sub-blocks with simple pattern will be truncated 1 or 2 bits before lossless compression and saves more bits to be allocated to the worst case sub-block with complex pattern.

According to another embodiment of the present invention, one or two blocks or sub-blocks of pixels are truncated one or 2 bits each pixel before applying an VLC coding to reduce and save more bits to allow in the block or sub-block with complex patterns.

According to another embodiment of the present invention, a bit rate estimation mechanism is applied to prediction which and whether a sub-block can be truncated with saving of more bits to be allocated to code the sub-block with high complexity.

According to another embodiment of the present invention, another bit rate estimation mechanism is applied to prediction whether the sub-block with high complexity can truncate less bit when given more bit to code that pixels.

It is to be understood that both the foregoing general description and the following detailed description are by examples, and are intended to provide further explanation of the invention as claimed.

DESCRIPTION OF THE PREFERRED EMBODIMENTS

Figure 1:
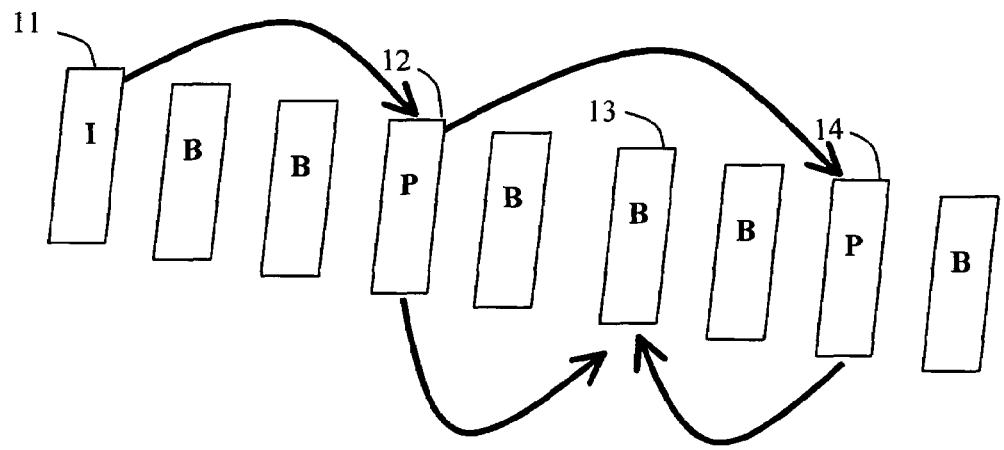
FIG. 1 shows three types of motion video coding, I-type, P-type and B-type coding structures.

There are essentially three types of picture coding in the MPEG video compression standard as shown in FIG. 1. I-frame 11, the "Intra-coded" picture, uses the block of pixels within the frame to code itself. P-frame 12, the "Predictive" frame, uses previous I-frame or P-frame as a reference to code the differences between frames. B-frame 13, the "Bi-directional" interpolated frame, uses previous I-frame or P-frame 12 as well as the next I-frame or P-frame 14 as references to code the pixel information.

In most applications, since the I-frame does not use any other frame as reference and hence no need of the motion estimation, the image quality is the best of the three types of pictures, and requires least computing power in encoding since no need for motion estimation. The encoding procedure of the I-frame is similar to that of the JPEG picture. Because of the motion estimation needs to be done in referring both previous and/or next frames, encoding B-type frame consumes most computing power compared to I-frame and P-frame. The lower bit rate of B-frame compared to P-frame and I-frame is contributed by the factors including: the averaging block displacement of a B-frame to either previous or next frame is less than that of the P-frame and the quantization step is larger than that in a P-frame. In most video compression standard including MPEG, a B-type frame is not allowed for reference by other frame of picture, so, error in B-frame will not be propagated to other frames and allowing bigger error in B-frame is more common than in P-frame or I-frame. Encoding of the three MPEG pictures becomes tradeoff among performance, bit rate and image quality, the resulting ranking of the three factors of the three types of picture encoding are shown as below:

|         | Performance (Encoding speed) | Bit rate | Image quality |
|---------|------------------------------|----------|---------------|
| I-frame | Fastest                      | Highest  | Best          |
| P-frame | Middle                       | Middle   | Middle        |
| B-frame | Slowest                      | Lowest   | Worst         |

Figure 2:
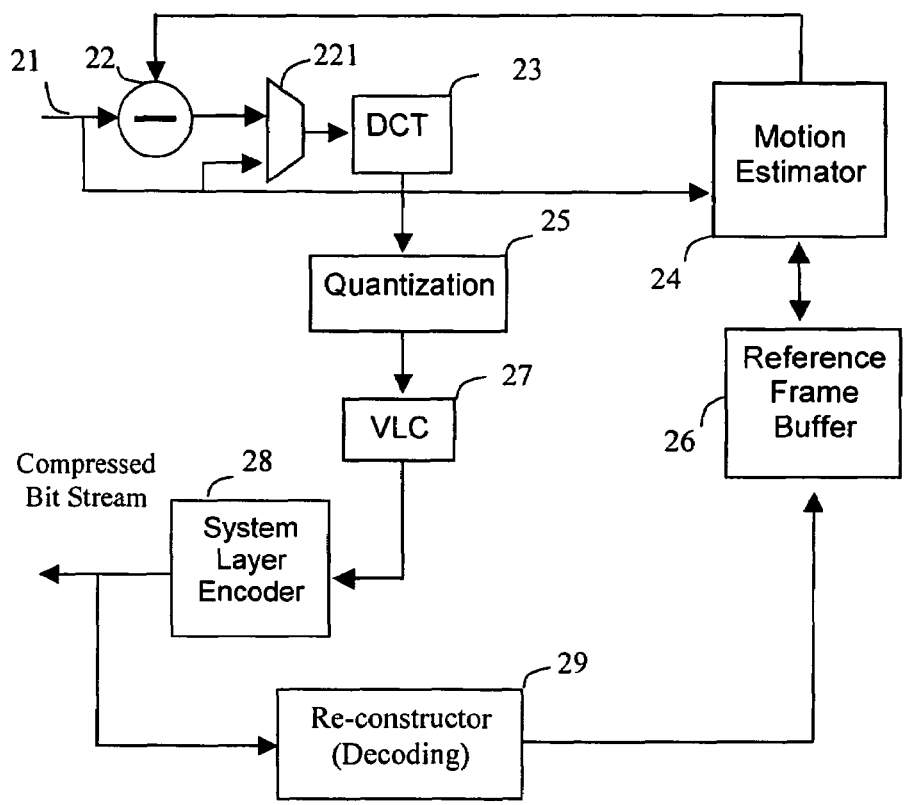
FIG. 2 depicts a block diagram of a video compression procedure with two referencing frames saved in so named referencing frame buffer.

FIG. 2 shows the block diagram of the MPEG video compression procedure, which is most commonly adopted by video compression IC and system suppliers. In I-type frame coding, the MUX 221 selects the coming original pixels 21 to directly go to the DCT 23 block, the Discrete Cosine Transform before the Quantization 25 step. The quantized DCT coefficients are packed as pairs of "Run-Length" code, which has patterns that will later be counted and be assigned code with variable length by the VLC encoder 27. The Variable Length Coding depends on the pattern occurrence. The compressed I-type frame or P-type bit stream will then be reconstructed by the reverse route of decompression procedure 29 and be stored in a reference frame buffer 26 as future frames' reference. In the case of compressing a P-frame, B-frame or a P-type, or a B-type macro block, the macro block pixels are sent to the motion estimator 24 to compare with pixels within macroblock of previous frame for the searching of the best match macroblock. The Predictor 22 calculates the pixel differences between the targeted 8×8 block and the block within the best match macroblock of previous frame or next frame. The block difference is then fed into the DCT 23, quantization 25, and VLC 27 coding, which is the same procedure like the I-frame coding.

In the encoding of the differences between frames, the first step is to find the difference of the targeted frame, followed by the coding of the difference. For some considerations including accuracy, performance, and coding efficiency, in some video compression standards, a frame is partitioned into macroblocks of 16×16 pixels to estimate the block difference and the block movement. Each macroblock within a frame has to find the "best match" macroblock in the previous frame or in the next frame. The mechanism of identifying the best match macroblock is called "Motion Estimation".

Figure 3:
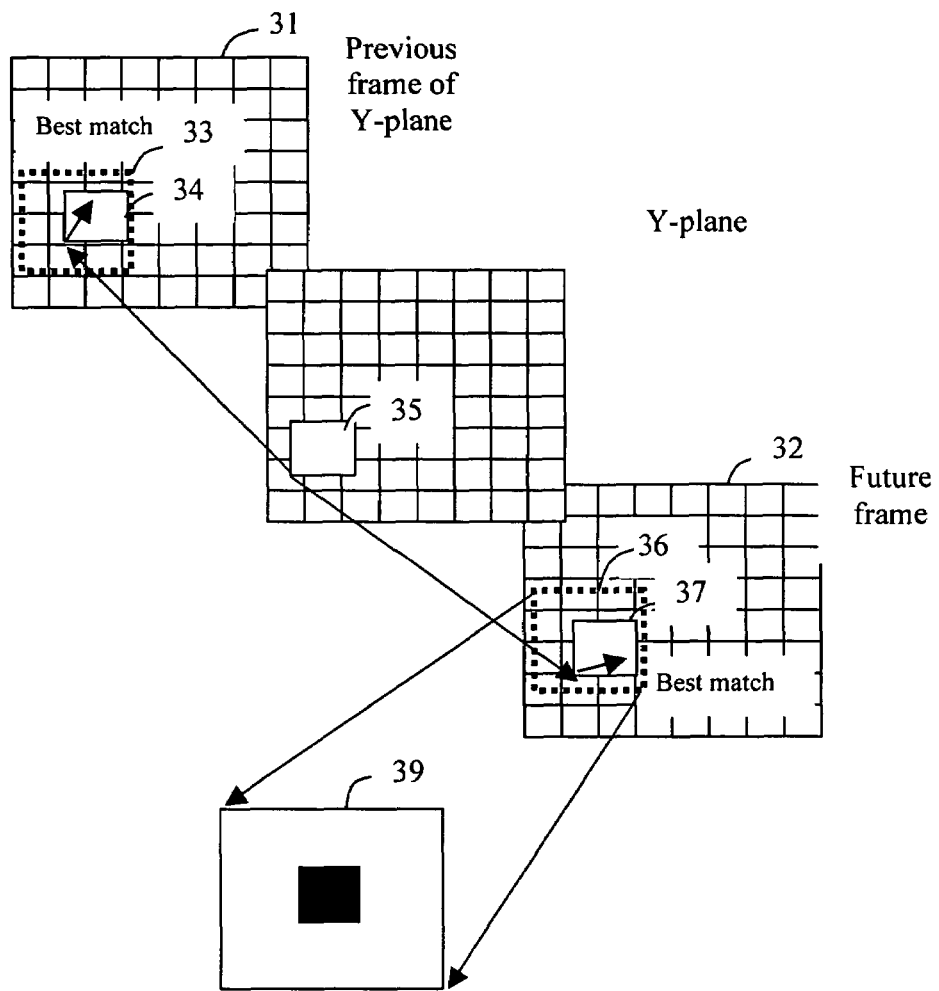
FIG. 3 illustrates the mechanism of motion estimation.

Practically, a block of pixels will not move too far away from the original position in a previous frame, therefore, searching for the best match block within an unlimited range of region is very time consuming and unnecessary. A limited searching range is commonly defined to limit the computing times in the "best match" block searching. The computing power hungered motion estimation is adopted to search for the "Best Match" candidates within a searching range for each macro block as described in FIG. 3. According to the MPEG standard, a "macro block" is composed of four 8×8 "blocks" of "Luma (Y)" and one, two, or four ""Chroma (2 Cb and 2 Cr)". Since Luma and Chroma are closely associated, in the motion estimation, only Luma motion estimation is needed, and the Chroma, Cb and Cr in the corresponding position copy the same MV of Luma. The Motion Vector, MV, represents the direction and displacement of the block movement. For example, an MV=(5, −3) stands for the block movement of 5 pixels right in X-axis and 3 pixels down in the Y-axis. Motion estimator searches for the best match macroblock within a predetermined searching range 33, 36. By comparing the mean absolute differences, MAD or sum of absolute differences, SAD, the macroblock with the least MAD or SAD is identified as the "best match" macroblock. Once the best match blocks are identified, the MV between the targeted block 35 and the best match blocks 34, 37 can be calculated and the differences between each block within a macro block are encoded accordingly. This kind of block difference coding technique is called "Motion Compensation".

The Best Match Algorithm, BMA, is the most commonly used motion estimation algorithm in the popular video compression standards like MPEG and H.26x. In most video compression systems, motion estimation consumes high computing power ranging from ~50% to ~80% of the total computing power for the video compression. In the search for the best match macroblock, a searching range, for example +/−16 pixels in both X- and Y-axis, is most commonly defined. The mean absolute difference, MAD or sum of absolute difference, SAD as shown below, is calculated for each position of a macroblock within the predetermined searching range, for example, a +/−16 pixels of the X-axis $$SAD(x, y) = \sum_{i=0}^{15} \sum_{j=0}^{15} |V_n(x+i, y+j) - V_m(x+dx+i, y+dy+j)|$$

$$MAD(x, y) = \frac{1}{256} \sum_{i=0}^{15} \sum_{j=0}^{15} |V_n(x+i, y+j) - V_m(x+dx+i, y+dy+j)|$$

and Y-axis. In above MAD and SAD equations, the Vn and Vm stand for the 16×16 pixel array, i and j stand for the 16 pixels of the X-axis and Y-axis separately, while the dx and dy are the change of position of the macroblock. The macroblock with the least MAD (or SAD) is from the BMA definition named the "Best match" macroblock. The calculation of the motion estimation consumes most computing power in most video compression systems.

Figure 4:
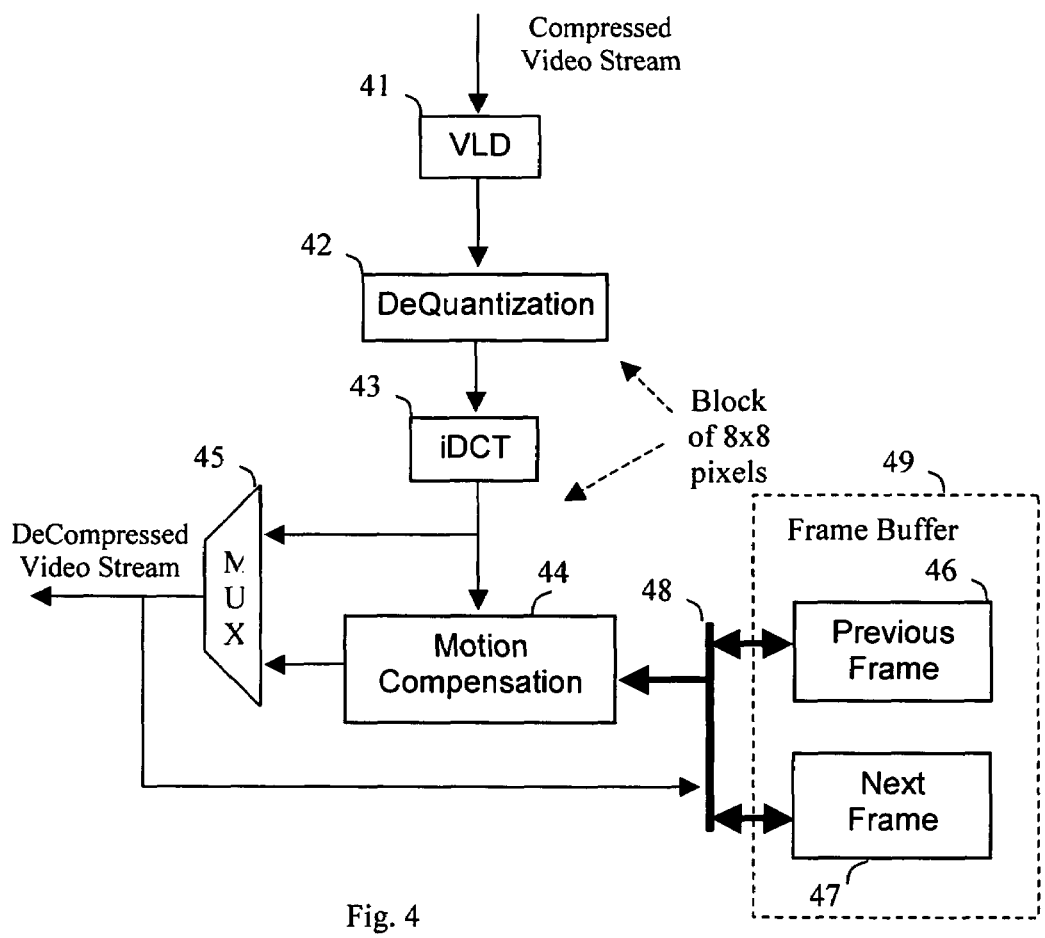
FIG. 4 depicts the block diagram of an MPEG video decoder without reference memory compression.

FIG. 4 illustrates the procedure of the MPEG video decompression. The compressed video stream with system header having many system level information including resolution, frame rate, ... etc. is decoded by the system decoder and sent to the VLD 41, the variable length decoder. The decoded block of DCT coefficients is shifted by the "Dequantization" 42 before they go through the iDCT 43, inverse DCT, and recovers time domain pixel information. In decoding the non intra-frame, including P-type and B-type frames, the output of the iDCT are the pixel difference between the current frame and the referencing frame and should go through motion compensation 44 to recover to be the original pixels. The decoded I-frame or P-frame can be temporarily saved in the frame buffer 49 comprising the previous frame 46 and the next frame 47 to be reference of the next P-type or B-type frame. When decompressing the next P-type frame or next B-type frame, the memory controller will access the frame buffer and transfer some blocks of pixels of previous frame and/or next frame to the current frame for motion compensation. Transferring block pixels to and from the frame buffer consumes a lot of time and I/O bandwidth of the memory or other storage device. To reduce the required density of the temporary storage device and to speed up the accessing time in both video compression and decompression, compressing the referencing frame image is an option and a new approach.

Figure 5A:
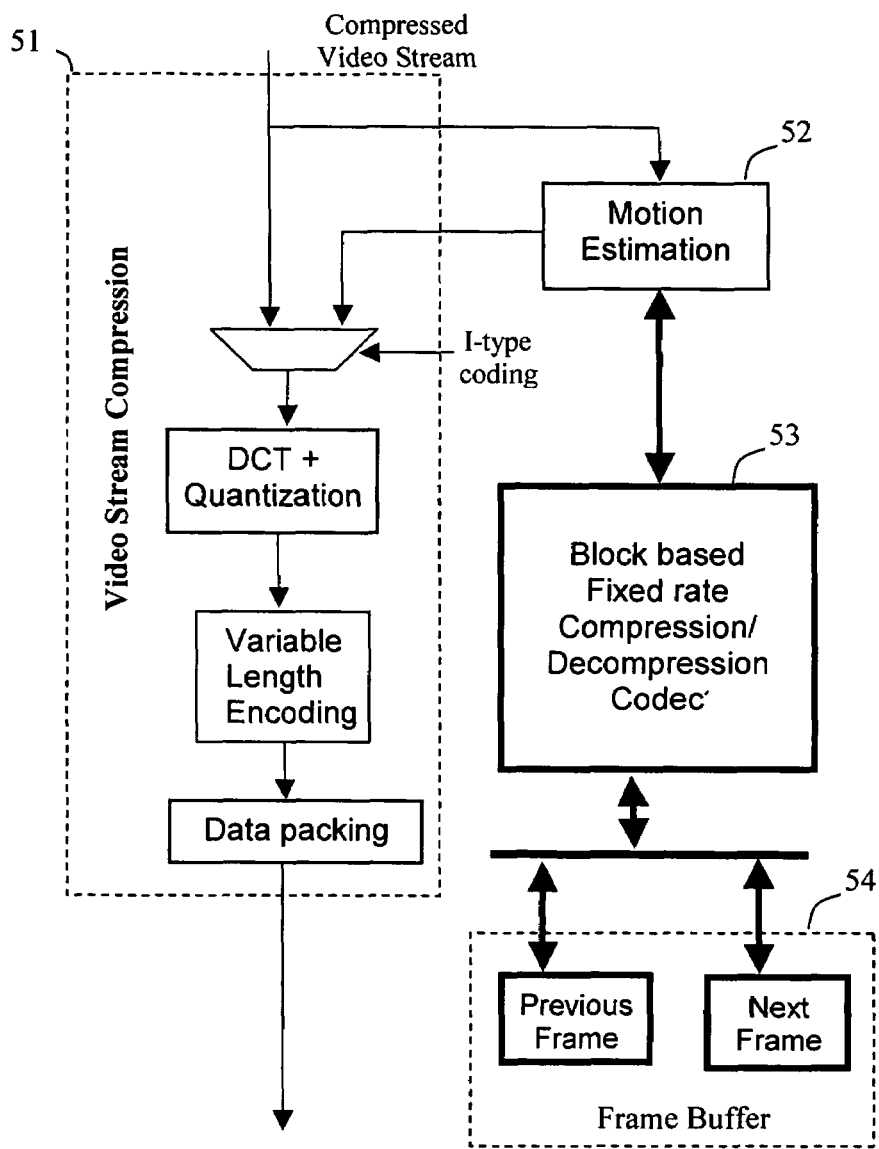
FIG. 5A depicts the block diagram of an MPEG video encoder with reference memory compression.
Figure 5B:
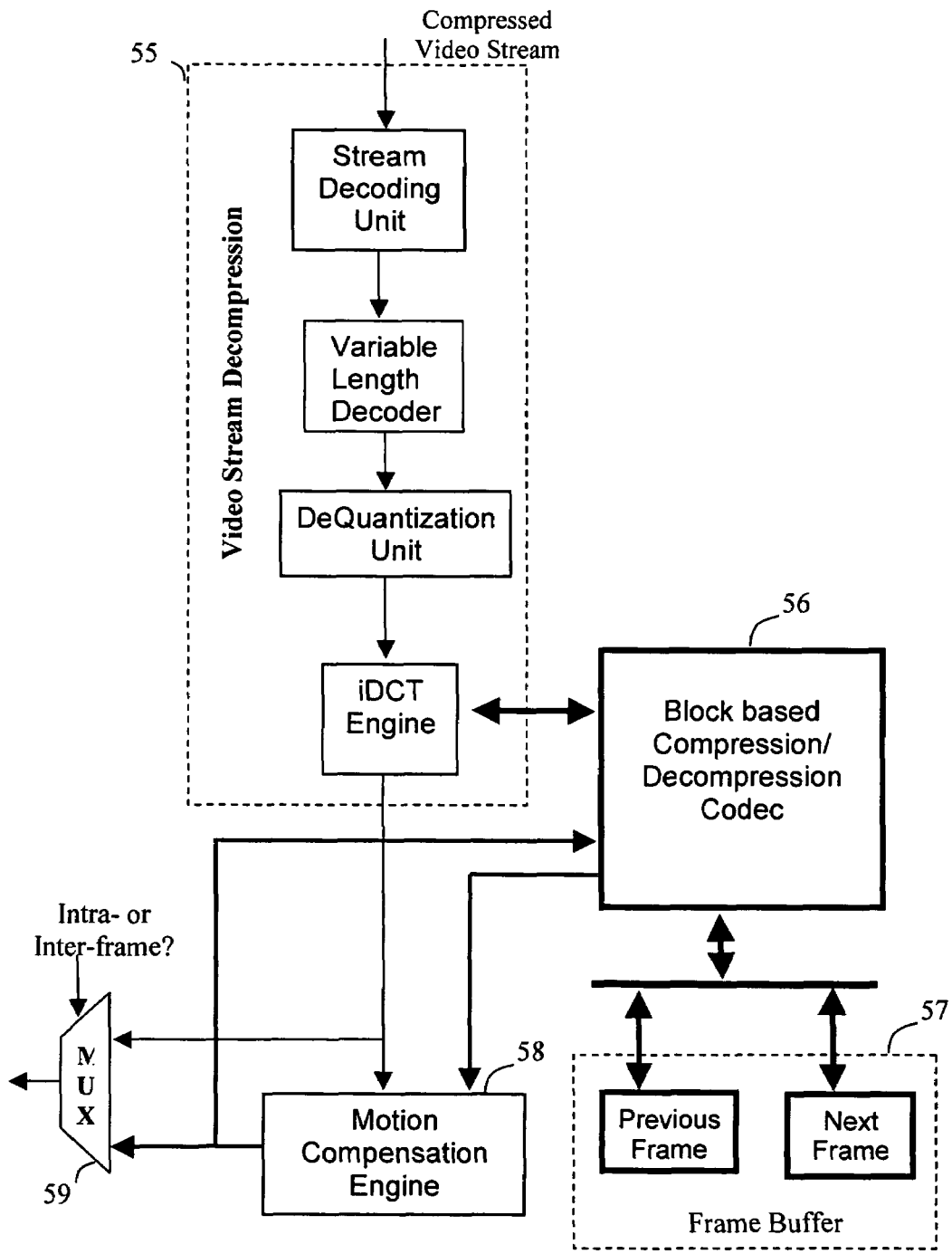
FIG. 5B depicts the block diagram of an MPEG video decoder with reference memory compression

FIG. 5A shows the video compression mechanism with the referencing frame buffer compression. The basic video compression procedure 51 includes DCT, quantization, a VLC coding and the final data packing. In the mode of non-intra coding, the coming picture are compared to previous and/or next frame for coding the difference which is called "motion estimation" 52. The reference block pixels of previous frame and/or the next frame are compressed before saving into the frame buffer 54. For making the frame buffer accessing easier, each block of pixels are compressed with a predetermined data rate 53. While, FIG. 5B shows the video decompression mechanism with the referencing frame buffer compression. The basic video decompression procedure 55 includes a video stream decoding unit, a VLC decoding unit, a de-quantization, and an inverse DCT. In the mode of non-intra decoding, the reference block pixels of previous frame and/or the next frame are compressed 56 with a predetermined data rate of each block before saving into the frame buffer 57. Those reconstructed pixels are used as referencing pixels for motion compensation 58 to reconstruct a frame of P-type or B-type picture. The output of motion compensated frame will be used as referencing frame for coming P- or B-frame and in the present method will be compressed block by block before saving to the storage device. To ease the access of the referencing memory, each block of pixels of the reference frame is compressed with a fixed predetermined data rate, for example 2.0×times.

Figure 6:
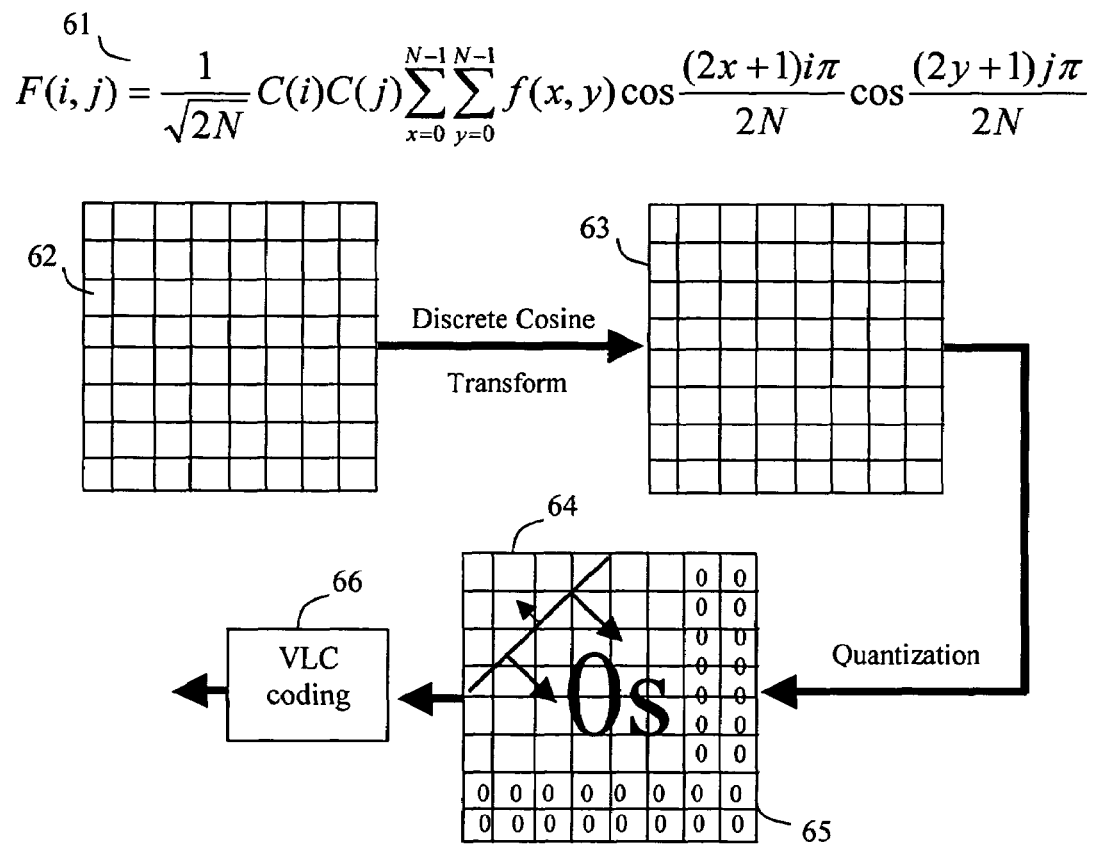
FIG. 6 depicts the procedure of a prior art of DCT based compression

FIG. 6 illustrates the commonly adopted prior art of image compression using DCT algorithm, the discrete cosine transform 61. A block of time domain pixels 62 are transformed into frequency domain "Coefficients" 63 with more DC coefficients concentrated in the left top corner and higher frequency coefficients in the right bottom corner. By applying quantization table with larger step in higher frequency coefficients can filter out data and reach data reduction without sacrificing much information since the high frequency coefficients don't dominate much the information and can be filtered out to be "0s" 63. The quantized coefficients are coded by a selected variable length coding algorithm 65. This DCT compression algorithm can reach visually good quality, but does not guaranty lossless quality in compression rate higher than 2× times.

Figure 7:
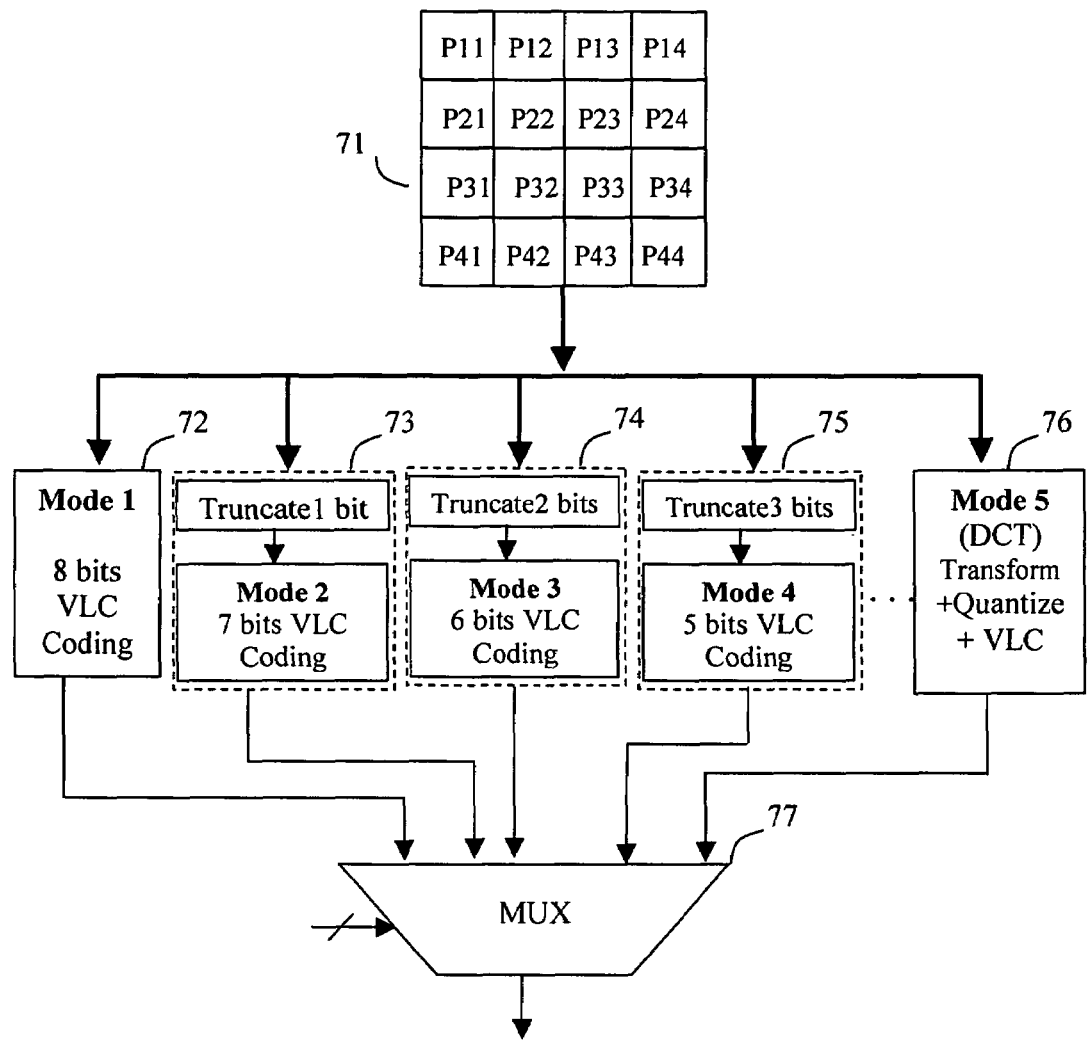
FIG. 7 depicts the new method of this invention of applying multiple modes of compression algorithms including a transform based method.

FIG. 7 illustrates this present invention of block by block compressing the referencing image frame. A block of pixel components 71 with are examined firstly, if they can be compressed with lossless quality under a predetermined data rate, then, this block will go through "Mode 1" which is a lossless compression mechanism 72 with the original bit length of all input block pixels. If a block of pixels do not reach lossless compression quality through Mode 1 with original bit lengths, this block pixels will go through "Mode 2" 73 with 1 LSB bit of all block pixels being truncated before going through the lossless compression mechanism. If block of pixels do not reach lossless compression quality through Mode 1 and Mode 2 with original bit lengths, this block pixels will go through "Mode 3" 74 with 2 LSB bits of all block pixels being truncated before going through the lossless compression mechanism. If block of pixels still do not reach lossless compression quality through Mode 1, Mode 2 and Mode 3 with original bit lengths, this block pixels will go through "Mode 4" 75 with 3 LSB bits of all block pixels being truncated before going through the lossless compression mechanism. If block of pixels still do not reach lossless compression quality through Mode 1 to Mode 4 with original bit lengths, this block pixels will go through "Mode 5" 76 with transfer function, converting time domain pixel data into frequency coefficients and quantization and a VLC coding method to reduce the data rate to the predetermined number. One of the 5 coding modes will be selected 77 to be the final code of a block compression. Besides the above truncation of 1 bit to 3 bits, truncating 4 bits of the original length of pixels, then going through the lossless compression or keeping the rest of MSB bits are also applied in this invention.

Figure 8:
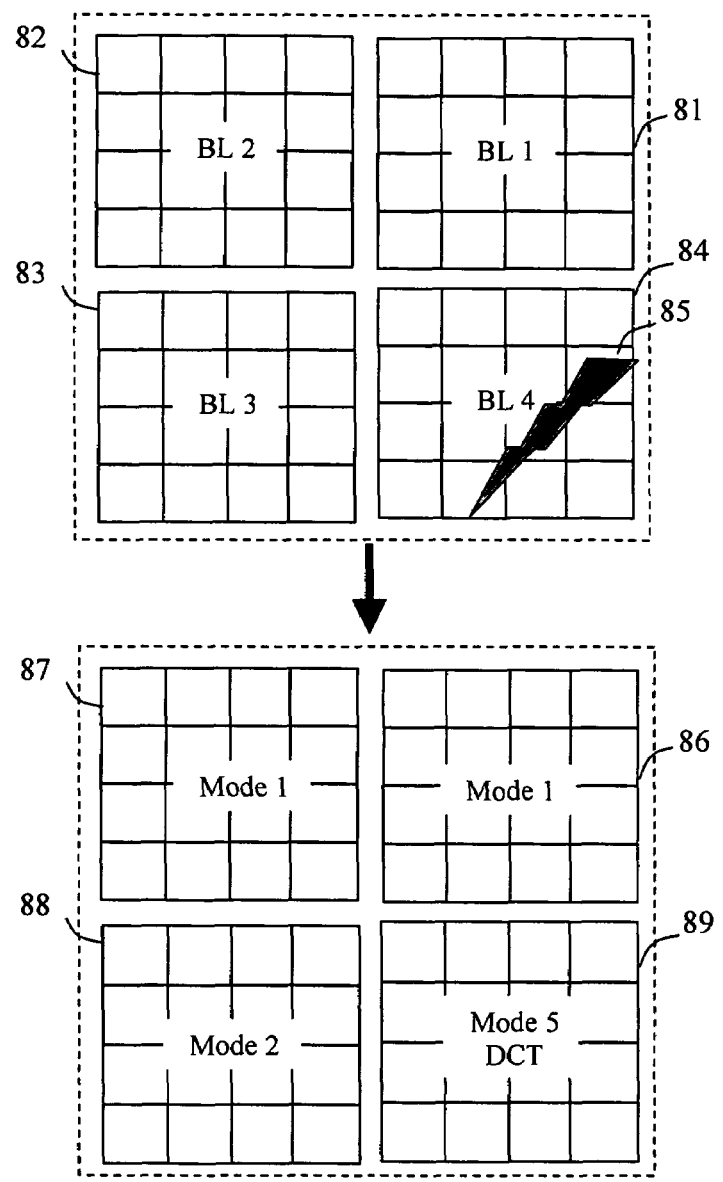
FIG. 8 depicts the concept of applying transform method to the sub-block with very complex pattern and lossless or slight lossy algorithms to other sub-blocks.

An example of block based image compression is depicted in FIG. 8 A group of blocks of pixels is partitioned into 4 blocks, BL1, BL2, BL3, BL4, 81, 82, 83, 84. BL1 and BL2 have simple pattern and can be compressed with Mode 1 86, 87 which is lossless compression with full bit length of all original pixel components. BL3 has more complex patter and is compressed by applying Mode 2, 88 truncating 1 LBS bit before applying a lossless compression VLC coding method. BL4 has most complex pattern and is compressed by Mode 5 89 which is a compression method with transform, quantization and an VLC coding.

Figure 9:
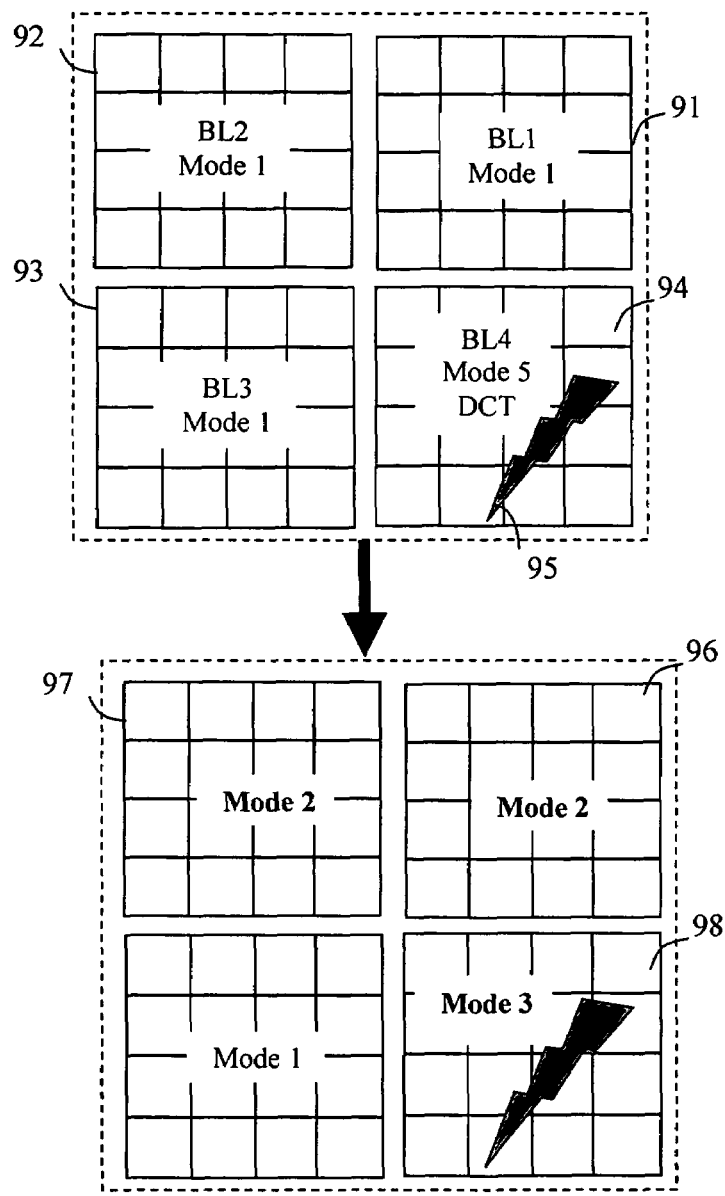
FIG. 9 depicts the procedure of sacrificing a little quality of sub-blocks with simple patter to allow more bits being allocated to the sub-block of complex pattern.

For further enhancing the image quality of the present invention of compressing the referencing image, 1 or 2 blocks within a group of blocks or sub-block within a block with simple pattern can go through Mode 2 or even mode 3 by truncating 1 or 2 LSB bits before going through the lossless VLC coding which saves more bits and allocates more bits to the worst case block (or sub-block) which has more complex pattern. FIG. 9 shows an example of this concept of allocating more bits from block(s) with simple pattern to the worst case block with more complex pattern. Originally, BL1, BL2 and BL3, 91, 92, 93 can be easily compressed by Mode 1 lossless compression with full bit length of pixels and BL4 having much complex pattern 95 and is compressed by applying Mode 5, a DCT transfer, quantization and VLC coding. In this invention, BL1 and BL2 are compressed by applying "Mode 2" 96, 97 instead of Mode 1, then, the saving of more bits can be used to code BL4 and making BL4 be compressed by "Mode 3" 98 instead of original Mode 5.

Applying or not applying this method can be determined by examining whether the complexity of the worst case sub-block pixel components are beyond the predetermined threshold value or at least one sub-block with most pixel components having error of 3 or more bits. In selecting the sub-block for truncating 1 LSB bit, the sub-block with very simple patter can not further reduce bit rate by truncating one LSI bit, so, the best choice is to select the sub-block which has complexity close to need truncating 1 LSB bit to obtain a lossless image quality, after truncating and after applying lossless compression. A bit rate estimation mechanism is applied to predict which sub-block will gain bit reduction after 1 LSB bit truncation and another bit rate estimation predicts whether the sub-block with complex pattern can be truncated less bit.

Most of this description are based on pixel has Y, U and V components. Actually, this method of invention applies to pixels with Red, Green and Blue component.

It will be apparent to those skills in the art that various modifications and variations can be made to the structure of the present invention without departing from the scope or the spirit of the invention. In the view of the foregoing, it is intended that the present invention cover modifications and variations of this invention provided they fall within the scope of the following claims and their equivalents.

What is claimed is:

1. A method for an encoder to compressing a block of pixels of a referencing frame image, comprising:

partitioning a block of pixels into a predetermined amount of sub-blocks with each sub-block having a predetermined amount of pixel components with the encoder;

if there is at least one sub-block with complexity beyond the predetermined threshold or having error of more than 3 bits for most pixel components when applying a selected lossless compression method, then taking the following procedures instead:

truncating one bit of at least one sub-blocks which can originally be compressed with lossless quality for the full bit length of pixel components with the encoder, and applying the lossless compression algorithm into this sub-block with the encoder; and allocating more bits saved from the sub-block with 1 bit truncated to allow the worst case sub-block with complex pattern to use compression algorithm of reaching higher image quality with the encoder.

2. The method of claim 1, wherein, with the encoder, the sub-block with high complexity is went through compression algorithm by firstly truncating one bit less than original bit number it has to truncate to meet lossless compression, then applying a lossless compression algorithm to compress the truncated pixel components.

3. The method of claim 1, wherein, with the encoder, a bit rate estimation mechanism is applied to select the sub-block which gains most bit rate reduction when 1 LSB bit of each pixel component is truncated and a lossless compression coding method is applied.

4. The method of claim 1, wherein, with the encoder, another bit rate estimation mechanism is applied to predict whether the sub-block with much complex pattern gains better image quality when more bits are allocated from other sub-block to be applied code it.

5. The method of claim 1, wherein, with the encoder, truncating 1 LSB bit of the sub-block to allocate more bits for sub-block with high complexity is done only when the complex sub-block can gain better image quality by truncating less bits.

6. The method of claim 1, wherein, with the encoder, the sub-block with most complex pattern within a group of blocks reduces the bit length needed to be truncated from 4 bits down to 3 bits or from 3 bits down to 2 bits when more bits are allocated from other sub-block by forcing truncating 1 LSB bits of each pixel component in the sub-block with simple pattern.

7. The method of claim 1, wherein, with the encoder, the sub-block with most complex pattern within a group of blocks changes compression method from a method with transforming algorithm to truncating 3 bits and applying a lossless coding algorithm.

8. The method of claim 1, wherein the pixel components are comprised of Y, U/Cr and V/Cb component or Red, Green and Blue components.

* * * * *